US00RE34763E

United States Patent [19]

Tucker

[11] E Patent Number: Re. 34,763

[45] Reissued Date of Patent: Oct. 25, 1994

[54] BEDDING ARTICLE FOR SUPPORTING INFANTS WITH GASTROESOPHAGEAL REFLUX CONDITION, AND OTHERS

[76] Inventor: Ann Tucker, P.O. Box 641117, Kenner, La. 70064

[21] Appl. No.: 14,315

[22] Filed: Feb. 5, 1993

Related U.S. Patent Documents

Reissue of:

[64] Patent No.: 4,989,286
Issued: Feb. 5, 1991
Appl. No.: 432,920
Filed: Nov. 7, 1989

U.S. Applications:

[63] Continuation-in-part of Ser. No. 118,635, Nov. 9, 1987, abandoned.

[51] Int. Cl.[5] ..... A47G 9/04

[52] U.S. Cl. ..... 5/482; 5/494; 2/69.5; 128/872

[58] Field of Search ..... 5/494, 424, 482; 2/69.5, 75, 80; 128/872, 873, 845

[56] References Cited

U.S. PATENT DOCUMENTS

| | | | |
|---|---|---|---|
| 1,959,920 | 5/1934 | Kaiser | 5/498 |
| 3,083,378 | 4/1963 | Pursell | 5/494 |
| 3,872,524 | 3/1975 | Hummel | 5/494 |
| 3,987,505 | 10/1976 | Mickey | 5/494 |
| 4,471,767 | 9/1984 | Guimond | 128/873 |
| 4,745,926 | 5/1988 | Hlusko | 128/873 |
| 4,802,244 | 2/1989 | McGrath-Saleh | 5/494 |
| 4,862,535 | 9/1989 | Roberts | 5/494 |

*Primary Examiner*—Alexander Grosz
*Attorney, Agent, or Firm*—Pravel, Hewitt, Kimball & Krieger

[57] ABSTRACT

A bedding article for supporting infants with gastroesophageal reflux condition comprising a band of bedding material defining at least a partial covering for the crib mattress and forming a tensile load carrying connection therewith and a infant support sling connected to the band of the bedding material.

12 Claims, 4 Drawing Sheets

BEDDING ARTICLE FOR SUPPORTING INFANTS WITH GASTROESOPHAGEAL REFLUX CONDITION, AND OTHERS

Matter enclosed in heavy brackets [ ] appears in the original patent but forms no part of this reissue specification; matter printed in italics indicates the additions made by reissue.

REFERENCE TO RELATED APPLICATION

This is a continuation-in-part of U.S. Ser. No. 07/118,635 filed Nov. 9, 1987 entitled "Infant Support Pad", *abandoned.*

BACKGROUND OF THE INVENTION

1. Field of the Invention

The present invention realtes to bedding articles such as mattress covers and the like for use with infant beds and more particularly relates to an improved bedding article for supporting infants requiring elevation for various illnesses. One example is a condition known as gastroesophageal reflux condition wherein a sling supports the child in a secure position wherein the matrress can be elevated to an angle (for example a 30° inclined position recommended by physicians for infants having condition) yet allowing easy access to the child and quick and safe removal of a child from a sling as needed.

2. General Background

Small infants that suffer from a condition known as gastroesophageal reflux condition are desireably kept in a crib that has a mattress with an elevated orientation of about thirty degrees (30°). The problem is that if the child is left unattended, it can very easily tumble or slide down the mattress if it begins to move about. The present invention provides a solution to this problem by providing an improved bedding article for supporting reflux babies upon an underlying crib mattress in an inclined position.

SUMMARY OF THE INVENTION

The present invention provides a band of bedding material defining at least a partial covering for the crib matrress and forming a low carrying connection therewith, the band having an end portion positioned during use in the middle area of the mattress, and an infant support sling being connected to the bedding material at the lower end portion thereof, including at least central left and right panel portions that can connect to define a diaper that covers the infants groin and pelvic area with leg apertures upon assembly accommodating the infants leg. The apertures being pointed generally away from tensile load carrying connectins so that when the mattress is inclined the diaper supports the infant and the band carries the infants weight at least partially in order to prevent a sliding of the infant down the inclined matrress during use.

In the preferred embodiment, the panels each carry fasteners for connecting one panel to another.

In the preferred embodiment, the bedding article includes a center panel that is generally T-shaped.

In the preferred embodiment, the bedding article provides side panels that each have means for forming a connection with the center panel wherein the side and center panels define a diaper shaped upon assembly.

In the preferred embodiment, the bedding article of the present invention provides a diaper-like configuration and size that can be adjustably varied to fit infants of different sizes.

In the preferred embodiment, the bedding article of the present invention provides a fabric case band that includes an endless band that encircles tha mattress with a first closed end adapted to register with an end of the mattress and a second opened lower end portion.

BRIEF DESCRIPTION OF THE DRAWINGS

For a further understanding of the nature, objects, and advantages of the present invention, reference should be had to the following detailed description, taken in conjunction with the accompanying drawings, in which like reference numberals denote like elements, and wherein.

DETAILED DESCRIPTION OF THE PREFERRED EMBODIMENT

Figure 1:
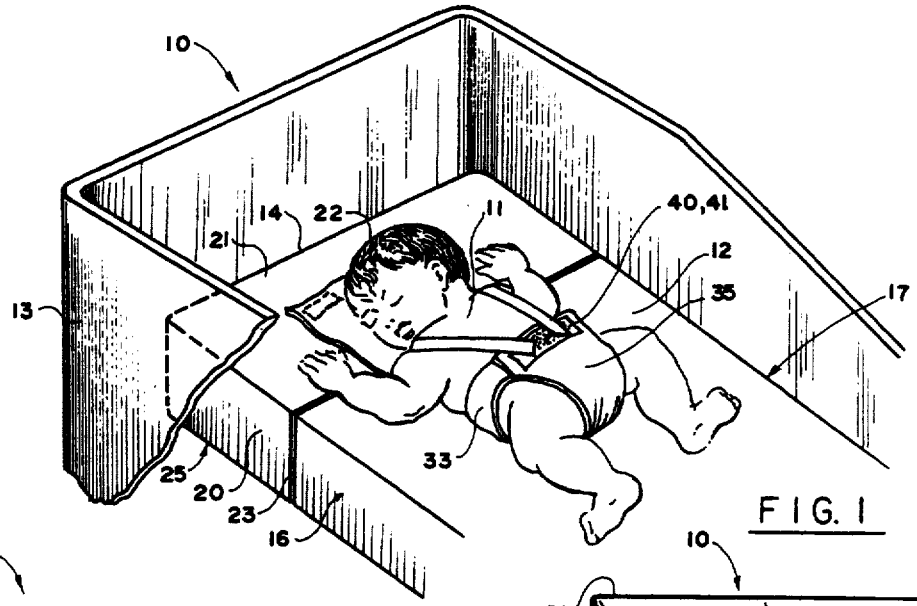
FIG. 1 is a partial perspective view of the preferred embodiment of the apparatus of the present invention.
Figure 2:
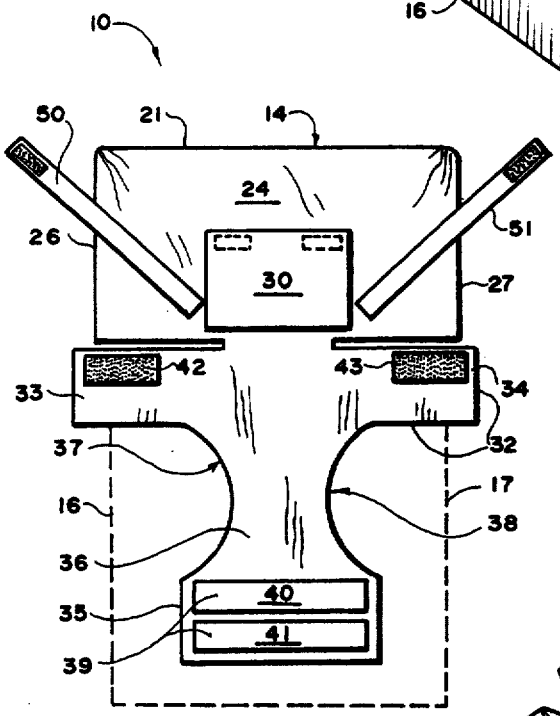
FIG. 2 is a top view of th epreferred embodiment of the apparatus of the present invention.

FIGS. 1–5 illustrate generally the preferred embodiment of the apparatus of the present invention designated generally bythe numberal 10. In FIG. 1 there can be seen an infant, designated by the numberal 11 resting upon a mattress 12 that is supported by a crib frame 13 which can be generally rectangular for example.

The mattress 12 likewise is rectangular providing an upper 14 and a lower 15 end portions and left 16 and right 17 side portions. The bedding article 10 of the present invention includes a band 20 of material defining at least a partial covering for the crib mattress 12 and forming a tensile load carrying connection therewith, the band 20 having an end portion 21 adjacent the child's head 22 which is preferably threaded upon the end portion 14 of the mattress. Thus, the band 20 slips upon mattress 12 in a similar fashion to the placement of a pillow case upon a pillow.

The band 20 includes a lower end portion 23 which extends away from the end portion 21 toward the center or even lowermost end portion of the mattress 12. In the embodiment of FIGS. 1–5, the band 20 extends longitudinally from its closed end portion 21 downwardly about one third ($\frac{1}{3}$) of the distance toward the end 15 of the mattress 12 as shown in FIGS. 1–4. Thus, the band 20 includes top 24, bottom 25, side 26, 27 portions which are substantially flat. Thus, the end portion 21 is a closed end portion and the end portion 23 defines an open end portion receptive of mattress 12. A head rest 30 is attached to upper surface 24 of band of material 20 and secure thereupon by stiching for example. The head rest 30 can be of terrycloth material or the like. Extending downwardly from the end portion 23 of the band of material 20 is T-shaped section 32 which includes left 33 and right 34 flaps as well as downwardly extending central flap 35 having a smaller diameter portion 36 defined by concave surfaces 37, 38.

Figure 3:
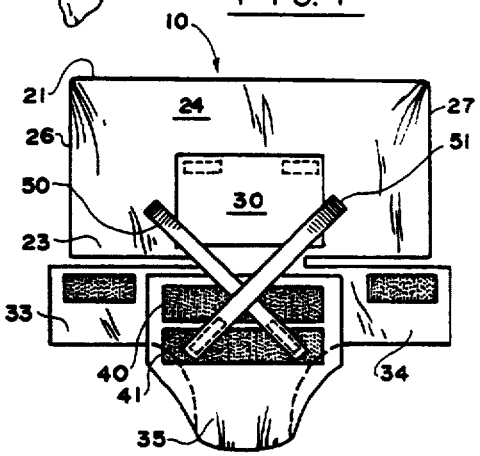
FIG. 3 is a top view of the preferred embodiment of the apparatus of the present invention showing the folded, in use position.
Figure 4:
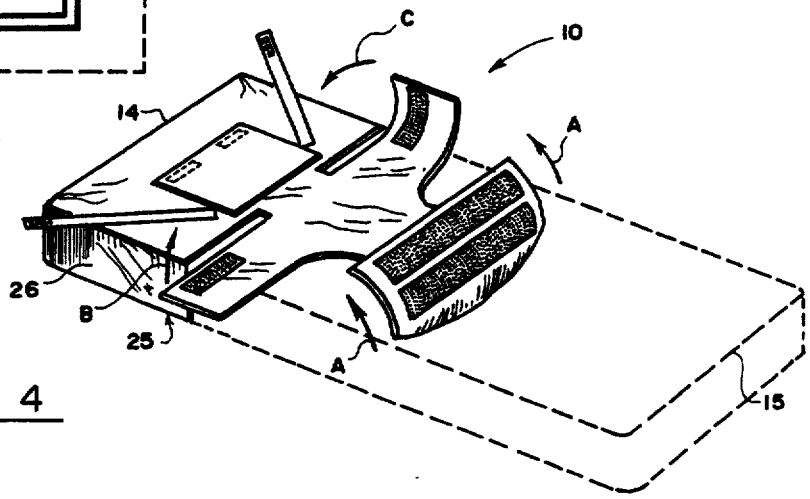
FIG. 4 is a perspective view of the preferred embodiment of apparatus of the present invention illustrating the apparatus during closure with the infant removed for purposes of illustration.

A closure tab 39 includes for example a pair of hook-and-loop type fasteners 40, 41, such as those sold under the trademark VELCRO®, which are receptive of hook-and-loop type closure members 42, 43, such as those sold under the trademark VELCRO®, of flaps 33, 34. It should be understood that buckles could be used in place of or in addition to the hook-and-loop type fasteners. In FIGS. 3 and 4, assembly of the flaps 33, 34, 35 upon the infant is illustrated. The arrows A in FIG. 4 show movement upwardly of the central flap 35 and movement inwardly of the left and right sde flaps, 33, 34 respectively as shown by the arrows B, C. In FIGS. 1, the infant can be seen secured with the central flap 35 and the side flaps 33, 34, defining a diaper-like attachment upon the infant 11 holding the infant to the band 20 of material which is secured to the mattress.

The band 20 defines a tensile connection between the infant 11 and the mattress 12. Shoulder straps 50, 51 are attached to top 24 of sheet of material 20 by stitching, for example. The free ends of straps 50, 51 carry, for example, hook-and-loop type fasteners, such as those sold under the trademark VELCRO®, so that the straps 50, 51 can be threaded over the infants shoulders and attached to the fasteners 40, 41 as shown in FIG. 1.

In FIG. 3, for purposes of illustration, the shoulder straps 50, 51 are shown assembled upon center panel 35 and more particularly connecting to the fastener 41 portion thereof. A fenestration could be provided if the article 10 is to be used in a transport unit such as a wheeled incubator or the like. The fenestration gives quick access to the umbilical cord.

Figure 5:
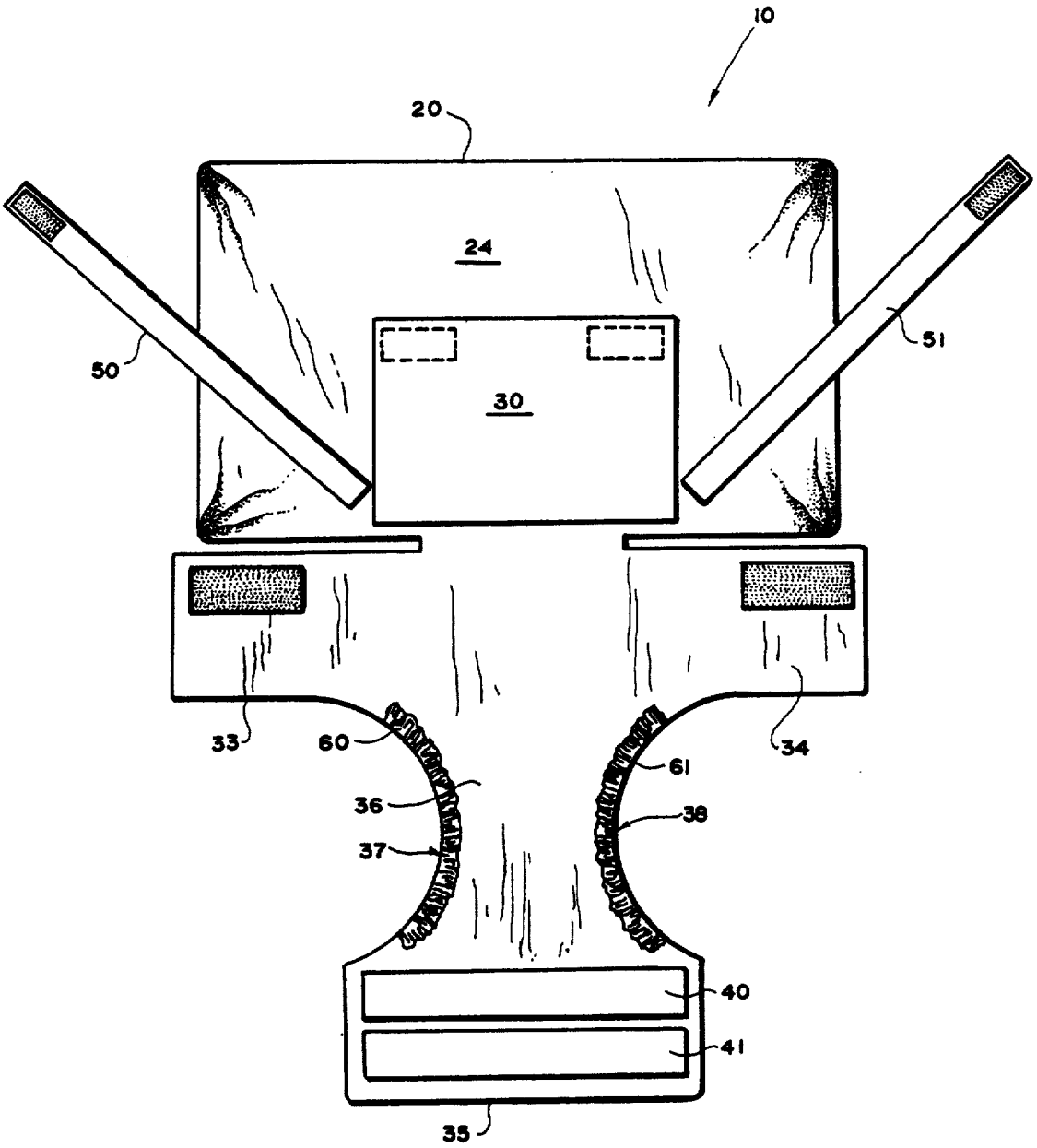
FIG. 5 is a top plan view of the preferred embodiment of the apparatus of the present invention removed from the infants mattress.

The apparatus of the present invention can be manufactured of any suitable fabric material such cotton, or the like or of a disposable material which is used for hospital drapes, gowns and the like. In FIG. 5, a plan view illustrates the apparatus of the present invention 10 removed from the mattress 12. As an optional feature, the concave area 37, 38 of central panel 36 can be supplied with elastic bands 60, 61 for securely contouring the central portion 35 to the infant's legs.

Figure 7:
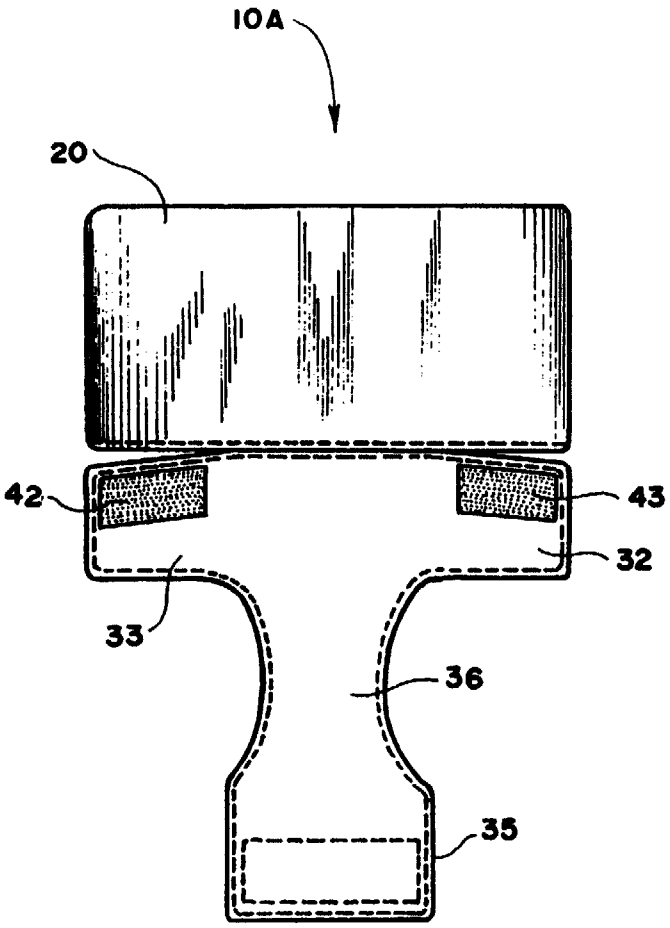
FIG. 7 is a bottom view of a second embodiment of the apparatus of the present invention.
Figure 6:
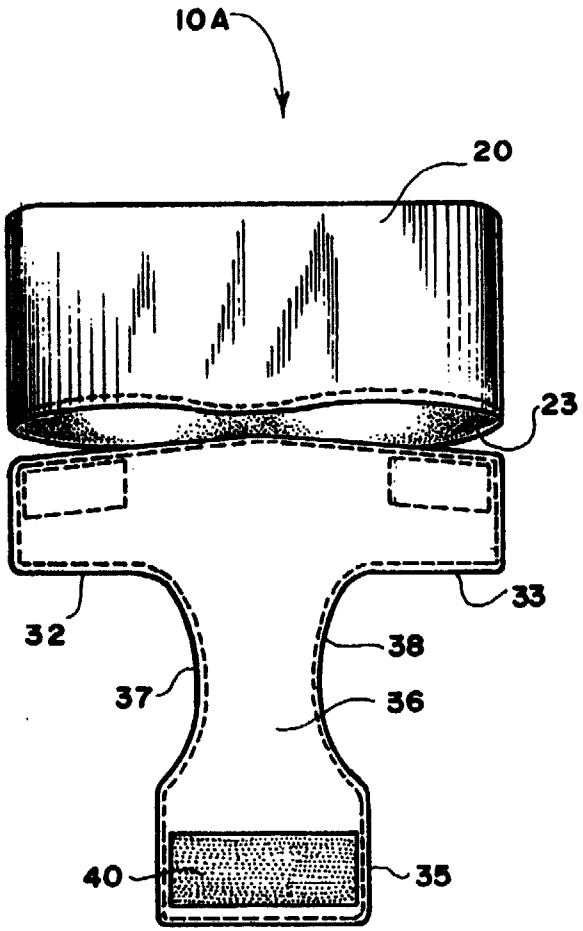
FIG. 6 is a top view of a second embodiment of the bedding article of the present invention.
Figure 9:
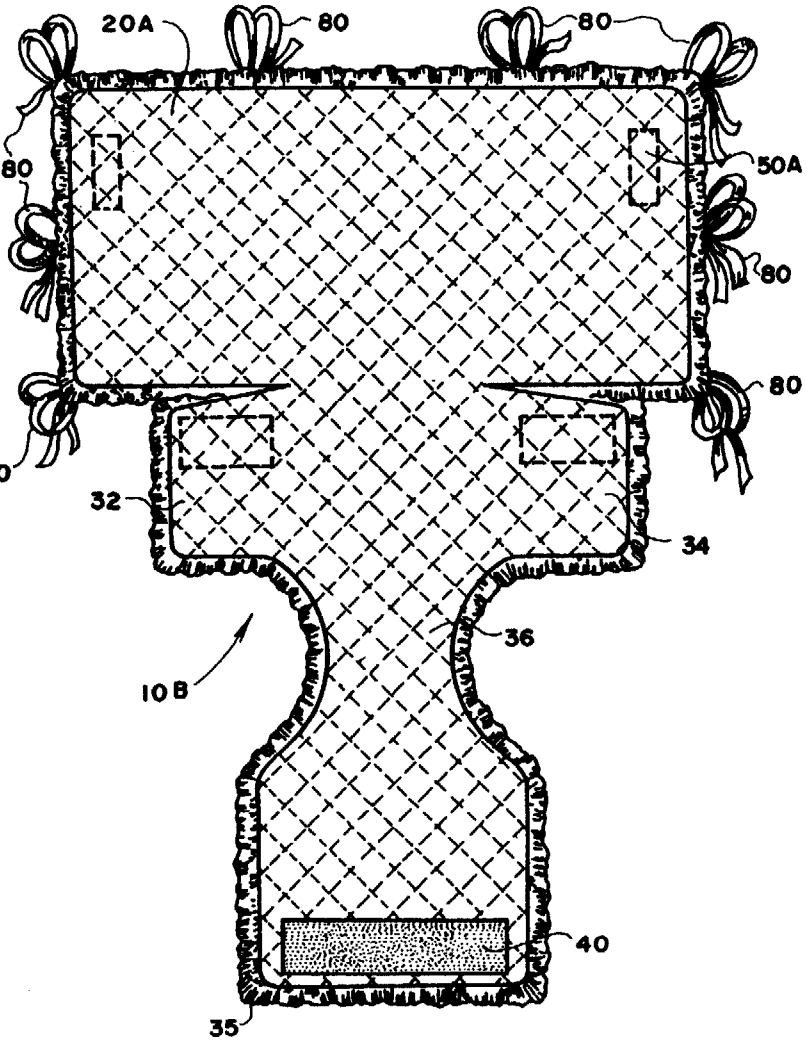
FIG. 9 is a bottom view of the third embodiment of the apparatus of the present invention.
Figure 8:
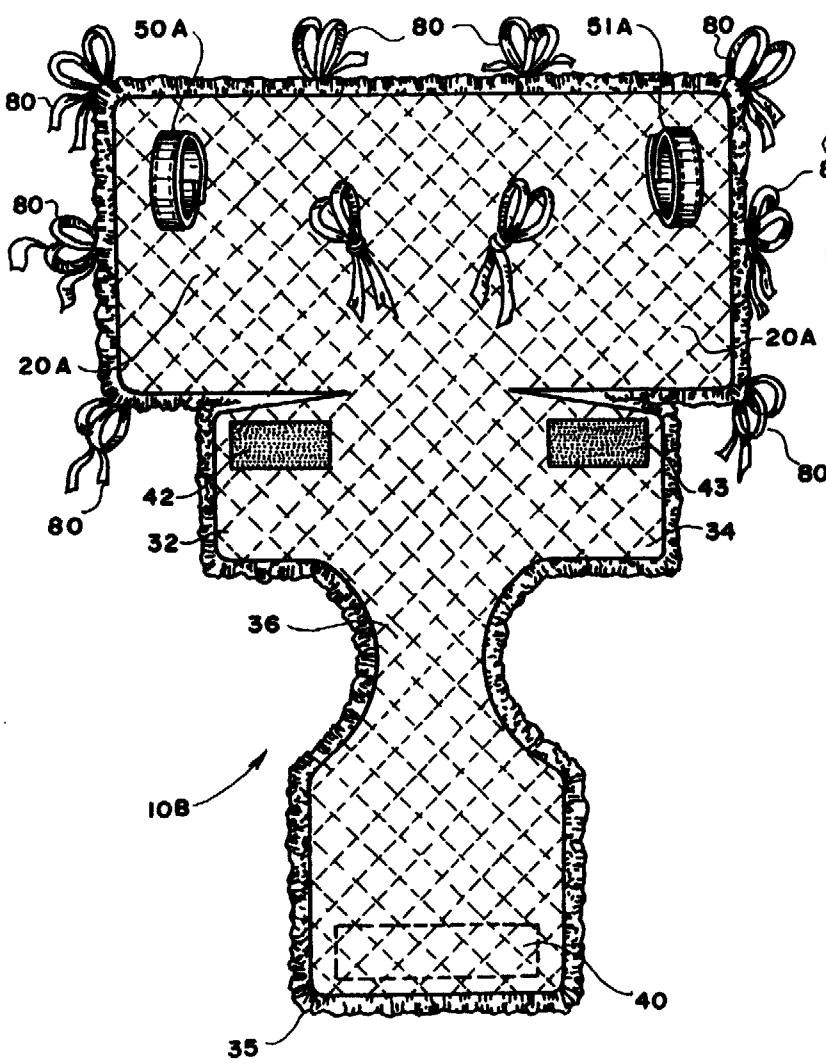
FIG. 8 is a top view of a third embodiment of the apparatus of the present invention.

In the embodiment of FIGS. 6 and 7 designated by the numberal 10A, the shoulder straps have been omitted. In the embodiment of FIGS. 8 and 9 designated by the numeral 10B the bedding article has a flat panel 20A that attaches at its periphery to the spindles of a crib using a plurality of string-like ties 80 thus panel 20A would preferably be configured to fit the upper surface of crib mattress 12. Arm bands 50A, 51A could secure the arms of the infant to hold the infant in a face down position upon panel 20A.

In view of the numerous modifications which could be made of the preferred embodiments disclosed herein without departing from the scope or spirit of the present invention, the details herein are to be interpreted as illustrative and not in a limiting sense.

What is claimed as invention is:

1. A bedding article for supporting reflux babies upon an underlying crib mattress in an inclined position comprising:

(a) a band of bedding material defining a partial covering for the crib mattress and forming a tensile load carrying connection therewith, the band having a lower end portin positioned during use at the middle area of the mattress;

(b) an infant support sling, connected to the band of bedding material at the lower end portion thereof and including a central panel portion, a left panel portion, and a right panel portion that can connect to define a diaper that covers the infant's groin and pelvic area, with leg apertures accommodating the infant's legs, the leg apertures being ponted generally away from the tensile load carrying connection so that when the mattress is inclined, the diaper supports the infant and the band carries the infant's weight to prevent a sliding of the infant down the mattress during use.

2. The bedding article of claim 1, wherein the panels each carry fasteners for connecting a panel to another panel.

3. The bedding article of claim 1, wherein the central panel portion is generally T-shaped.

4. The bedding article of claim 1, wherein each side panel has means for forming a connection with the central panel portion that defines a diaper shape upon assembly.

5. The bedding article of claim 4, wherein the diaper size can be adjustably varied to fit infants of different sizes.

6. A bedding article for supporting reflux babies upon an underlying crib mattress in an inclined position comprising:

(a) a band of bedding material defining a partial covering for the crib mattress and forming a tensile load carrying connection therewith, the band having a lower end portion positioned during use at the middle area of the mattress; and (b) an infant support sling, connected to the band of bedding material at the lower end portion thereof and including a central panel portion, a left panel portion, and a right panel portion that can connect to define a diaper that covers the infant's groin and pelvic area, with leg apertures accommodating the infant's legs, the leg apertures being pointed generally away from the tensile load carrying connection so that when the mattress is inclined, the diaper supports the infant and the band carries the infant's weight to prevent a sliding of the infant down the mattres during use, wherein the band includes an endless band that encircles the mattress, with a first closed end adapted to register with an end of the mattress, and a second open lower end.

*7. A bedding article for supporting persons upon an underlying mattress in an inclined position comprising:*

*(a) a band of bedding material defining a partial covering for the mattress and forming a tensile load carrying connection therewith, the band having a lower end portion positioned during use at the middle area of the mattress;*

*(b) a support sling, connected to the band of bedding material at the lower end portin thereof and including a central panel portion, a left panel portion, and a right panel portion that can connect to define a diaper that covers the person's groin and pelvic area, with leg apertures accommodating the person's legs, the leg apertures being pointed generally away from the tensile load carrying connection so that when the mattress*

*is inclined, the diaper supports the person and the band carries the person's weight to prevent a sliding of the person down the mattress during use.*

*8. The bedding article of claim 7, wherein the panels each carry fasteners for connecting a panel to another panel.*

*9. The bedding article of claim 7, wherein the central panel portion is generally T-shaped.*

*10. The bedding article of claim 7, wherein each side panel has means for forming a connection with the central panel portion that defines a diaper shape upon assembly.*

*11. The bedding article of claim 10, wherein the diaper size can be adjustably varied to fit persons of different sizes.*

*12. A bedding article for supporting persons upon an underlying mattress in an inclined position comprising:*

*(a) a band of bedding material defining a partial covering for the mattress and forming a tensile load carrying connection therewith, the band having a lower end portion positioned during use at the middle area of the mattress;*

(b) a support sling, connected to the band of bedding material at the lower end portion thereof and including a central panel portion, a left panel portion, and a right panel portion that can connet to define a diaper that covers the person's groin and pelvic area, with leg apertures accommodating the person's legs, the leg apertures being pointed generally away from the tensile load carrying connection so that when the mattress is inclined, the diaper supports the person and the band carries the person's weight to prevent a sliding of the person down the mattress during use; and

*(c) wherein the band includes an endless band that encircles the mattress, with a first closed end adapted to register with an en dof the mattress, and a second open lower end.*

* * * * *